US 6,683,715 B2

(12) United States Patent
Kovacs

(10) Patent No.: US 6,683,715 B2
(45) Date of Patent: Jan. 27, 2004

(54) APPARATUS FOR THE IMPROVEMENT OF THE OPTICAL QUALITIES OF OPTICAL MICROSCOPES

(76) Inventor: Istvan Kovacs, 64 Tuzok u. 64, Erd, Hungary H-2030 (HU)

( * ) Notice: Subject to any disclaimer, the term of this patent is extended or adjusted under 35 U.S.C. 154(b) by 10 days.

(21) Appl. No.: 10/045,294

(22) Filed: Oct. 18, 2001

(65) Prior Publication Data

US 2003/0076586 A1 Apr. 24, 2003

(51) Int. Cl.$^7$ .......................... G02B 21/06; G02B 21/00
(52) U.S. Cl. ................. 359/385; 359/368; 359/380
(58) Field of Search .................. 359/363, 368–390

(56) References Cited

U.S. PATENT DOCUMENTS

| 5,235,457 A | * | 8/1993 | Lichtman et al. ............. 359/368 |
| 5,296,962 A | * | 3/1994 | Furuhashi ..................... 359/388 |
| 5,668,660 A | * | 9/1997 | Hunt ............................ 359/380 |
| 6,075,643 A | * | 6/2000 | Nonoda et al. ............... 359/385 |

FOREIGN PATENT DOCUMENTS

WO           62113    * 10/2000  ................ 359/381

* cited by examiner

Primary Examiner—Thong Nguyen
(74) Attorney, Agent, or Firm—Blakely, Sokoloff, Taylor & Zafman, LLP

(57) ABSTRACT

The device serves for the improvement of the optical qualities of an optical microscopes. The microscopes includes an illuminating unit, a condenser lens, a primary microscope objective with an optical axis, and an ocular or a camera. The device is insertable between the primary microscope objective and the ocular or camera, and includes a rotatable image visualizing plate and a secondary objective. The secondary objective is positioned on the optical axis when the apparatus is inserted in the microscope and has the same orientation as the primary microscope objective. The device also includes a tertiary microscope objective that is arranged between the image visualizing plate and the secondary objective. The tertiary microscope objective is arranged on the same optical axis as the secondary objective and is inversely orientated with respect to the secondary objective.

8 Claims, 3 Drawing Sheets

APPARATUS FOR THE IMPROVEMENT OF THE OPTICAL QUALITIES OF OPTICAL MICROSCOPES

BACKGROUND

The invention relates to apparatus for the improvement of the optical qualities of optical microscopes, preferably for increasing the magnifying capacity, relative depth sharpness and the resolving power of such microscopes that are also suitable for producing three-dimensional images. A further object of this invention is to provide an image-producing device that can be attached to, or built into such apparatus, and can be used also as a part of the apparatus according to the invention.

DESCRIPTION OF RELATED ART

Magnifying instruments of various types are indispensable in the technical and scientific spheres of life, e.g. optical microscopes, macroscopes, astronomical telescopes as well as instruments for space research, but photography, film production and film projection can not be undertaken without optical magnifying instruments either. Obviously there is a great demand for the improvement of the optical qualities of magnifying apparatus, e.g. of optical microscopes, for increasing their magnifying power, relative depth sharpness and higher resolving power.

The published Hungarian patent application No. 5153/86 relates to an apparatus the purpose of which is to satisfy the demand for improving the quality of known magnifying systems, that is to improve optical qualities of composite magnifying systems, e.g. their relative depth sharpness and resolving power. The proposed apparatus consists of primary and secondary objectives and between them an image visualizing plate containing an image visualizing layer between the primary and secondary objectives. The image visualizing plate is positioned in the image plane of the primary objective, which coincides with the object plane of the secondary objective, and it is moved and also rotated at this point. The image visualizing plate contains particles dissipated in a substance, the refractive index of which particles differs from the refractive index of the substance A matt glass sheet may be used, for example, as an image visualizing plate.

When using such image visualizing plates depending on their actual construction and material—the quality of the image produced by the composite magnifying apparatus, or microscopes mentioned in the introduction of this specification can, in theory, be improved to some extent, the required depth of sharpness and good resolving power, as well as images with sharp contrasts/contours could be obtained, yet practical experience proves that in cases of magnifications exceeding eight hundred times, certain fuzziness, chromatic and other aberrations occur on the magnified images of the microscopic sections, along their contours, due to which aberrations blurred images can be produced.

An object of this invention is to provide an apparatus that also contains a rotating image visualizing plate through which the optical qualities of the various types of magnifying instruments, particularly optical microscopes can be improved, their relative depth of sharpness, magnifying capacity and resolving power can be increased, and by this means also in cases far exceeding the above mentioned magnification range, aberrations, rainbow-effects and other faults can be avoided, thereby faultless images of the required sharpness can be obtained.

SUMMARY

The invention is based on the recognition that if a tertiary microscope objective is inserted between the rotatable image visualizing plate and the secondary microscope objective in an inverse position as compared to the latter, the above-mentioned causes of fuzziness and chromatic aberrations of the image are eliminated, by moving the inserted tertiary objective to-and-fro along the optical axis; or by increasing the length of the light path the sharpness of the image can be regulated and even set as required, if the tertiary objective is held in a fixed position, and a mirror-pair is placed in the light path between the tertiary and secondary objectives, the members of the V-shaped mirrors forming a 90 degree angle with each other and the mirrors being arranged at a distance from and parallel to each other. In this latter solution the tertiary objective of the apparatus is in a fixed position and the sharpness of the image is obtained through the movement of the two mirror-pairs placed in the way of the light path between the secondary and tertiary objectives moved in relation to one and other, preferably by the to-and-fro movement of one mirror pair.

Various types of such devices can be used as a rotating image visualizing plate; e.g. according to our further recognition a structure that consists of two parts as described in the following may be suitable for the apparatus according to the invention. One part of this device is a rigid transparent sheet, functioning as the image visualizing plate's carrying body for a single layer of transparent image visualizing substance, which is the second part of the device. This substance is applied to the carrying body in a liquid, spreadable state, where it sticks/adheres, solidifies, yet remains transparent, though simultaneously or subsequently to its application, small concavations and protrusions and sideways standing formations are created in it, these blend into one another; in other words: the layer is composed of such formations. A two component synthetic-resin can be used as the basic material of the image visualizing layer, like the substance called "UVE Rapid", available in the retail trade.

On the basis of the above detailed recognition, the object according to the invention was attained by an apparatus for the improvement of optical qualities of optical microscopes, said microscopes comprising an illuminating unit, a condenser lens, a primary microscope objective with an optical axis, and an ocular or a camera; said apparatus being insertable between the primary microscope objective and the ocular or camera, and said apparatus comprising a rotatable image visualizing-plate and a secondary objective, whereby said secondary objective is positioned on said optical axis when the apparatus is inserted in the microscope and it has the same orientation as the primary microscope objective.

This apparatus is characterised in that that it comprises a tertiary microscope objective that is arranged between the image visualizing plate and the secondary objective, the tertiary microscope objective being arranged on the same optical axis as the secondary objective and being inversely orientated with respect to the secondary objective.

In order to be able to regulate and set image-sharpness the tertiary objective is movable to-and-fro along its optical axis.

According to another example of the apparatus mirror-pairs for regulating the image sharpness are built into the apparatus, the mirror pairs have a V-pattern in cross-section and are arranged with a variable spacing from each other; the mirror-pairs have mirrors forming a 90 degree angle with each other, and enclose a 45 degree angle with a plane extending between the secondary microscope objective and the tertiary microscope objective and which is vertical to the optical axis of the apparatus; one mirror pair of the mirror pairs has a fixed position between the secondary objective and the tertiary objective, and the other mirror pair is placed aligned and parallel with the fixed mirror pair and is movable to and from it; the outer surface of the mirrors of the fixed mirror pair, and the inner surface of the mirrors of the movable mirror pair is formed as a reflecting surface (sleek).

It may also be advantageous to arrange a divided linear polar foil between the collector lens and the condenser lens of the optical microscope and placing linear polar fiol(s) on the ocular lens, preferably on the binocular.

Advantageously the image visualizing plate has a rigid, transparent carrying body and an image visualizing layer formed on the surface of the carrying body, and this image visualizing layer being formed by a substance applied in liquid state to the surface of the carrying body, the substance is transparent in its solidified state on this surface, the free surface of the solidified substance contains concavations and protrusions blending into each other with arcuate (curved) sections.

According to a preferred example of the image visualizing plate the carrying body is preferably formed by a circular disc made of a solid plastic plate with a mass density lower than that of glass, or by a plastic or metal screen plate containing apertures of 0.5–3.0 mm; this carrying body is heat and deformation resistant in the temperature-range of −40° C. and +100° C. and has a thickness of 0.75–0.8 cm.

Advantageously on the surface of the image visualizing layer covering the carrying body there are 20–50 concavations and protrusions/cm², their average depth and height, respectively is about 10.0–20.0 $\mu$m, preferably between 15.0–18.0 $\mu$m, and the deviation from the average depth/height values is preferably not more than 50%; and the area of projection of configurations appearing and measured under and above a fictitious dividing plane and blending into each other with arcuate (curved) sections is about between 2.0–5.0 mm².

Finally, it may be advantageous if the image visualizing layer is formed by a two-component synthetic resin or a synthetic foam or polystyrene dissolved in a nitro-solvent or a varnish (lacquer) derivative (nitro-varnish) or by some similar substance applied in liquid form to the surface of the carrying body, and configurations blending into each other are made in the substance in its not yet solidified state, and then the substance is allowed to solidify.

BRIEF DESCRITPION OF SERVERAL VIEWS OF THE DRAWINGS

The invention will now be described in detail by means of preferred examples of the apparatus and image-producing device contained in the accompanying drawings, in which FIG. 1 is one of the preferred examples of the apparatus according to the invention, presented in a position in which it is built together with an optical microscope, shown in a schematic "exploded" diagram;

DETAILED DESCRITPION

Figure 1:
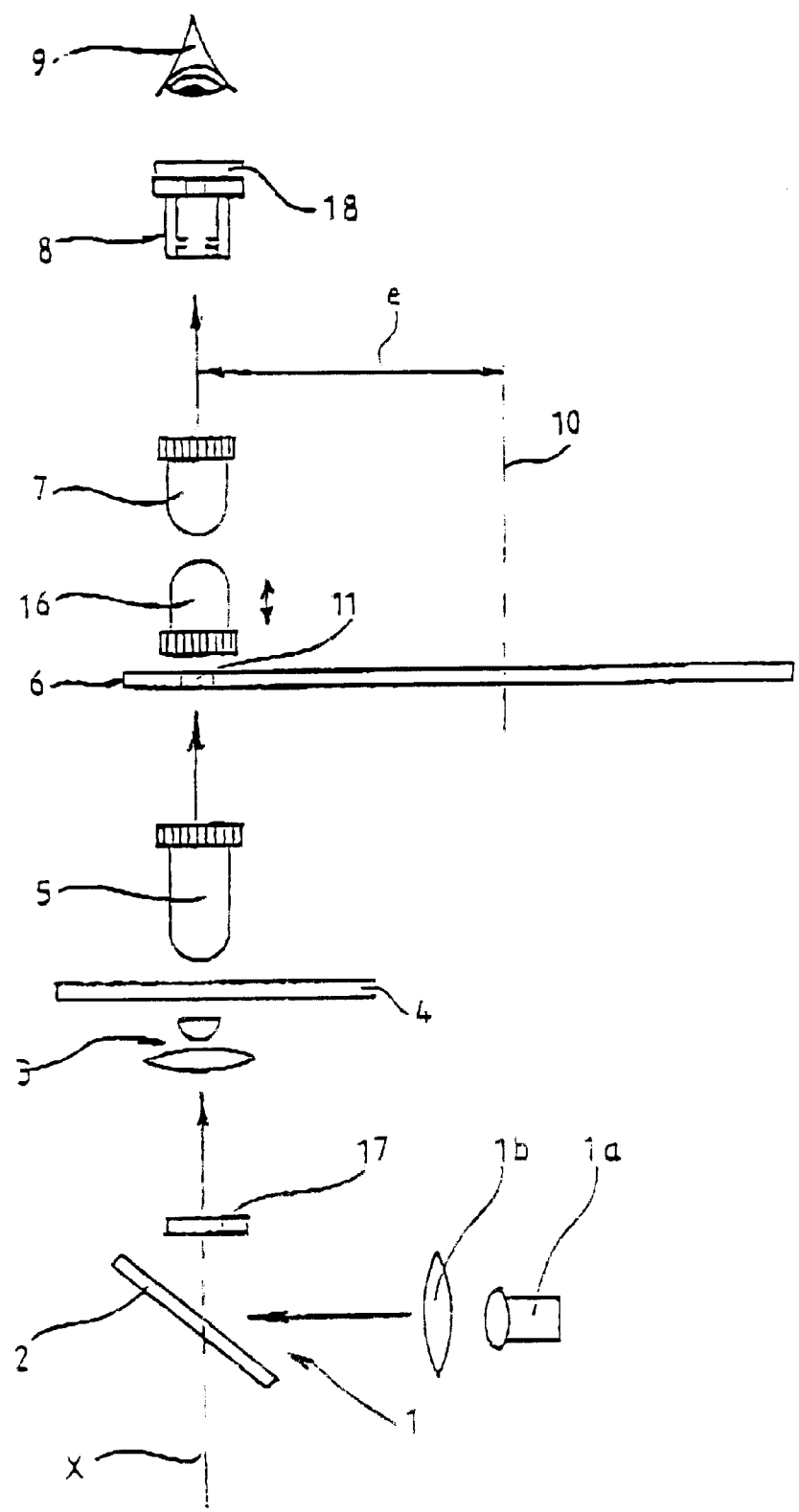
Figure 2:
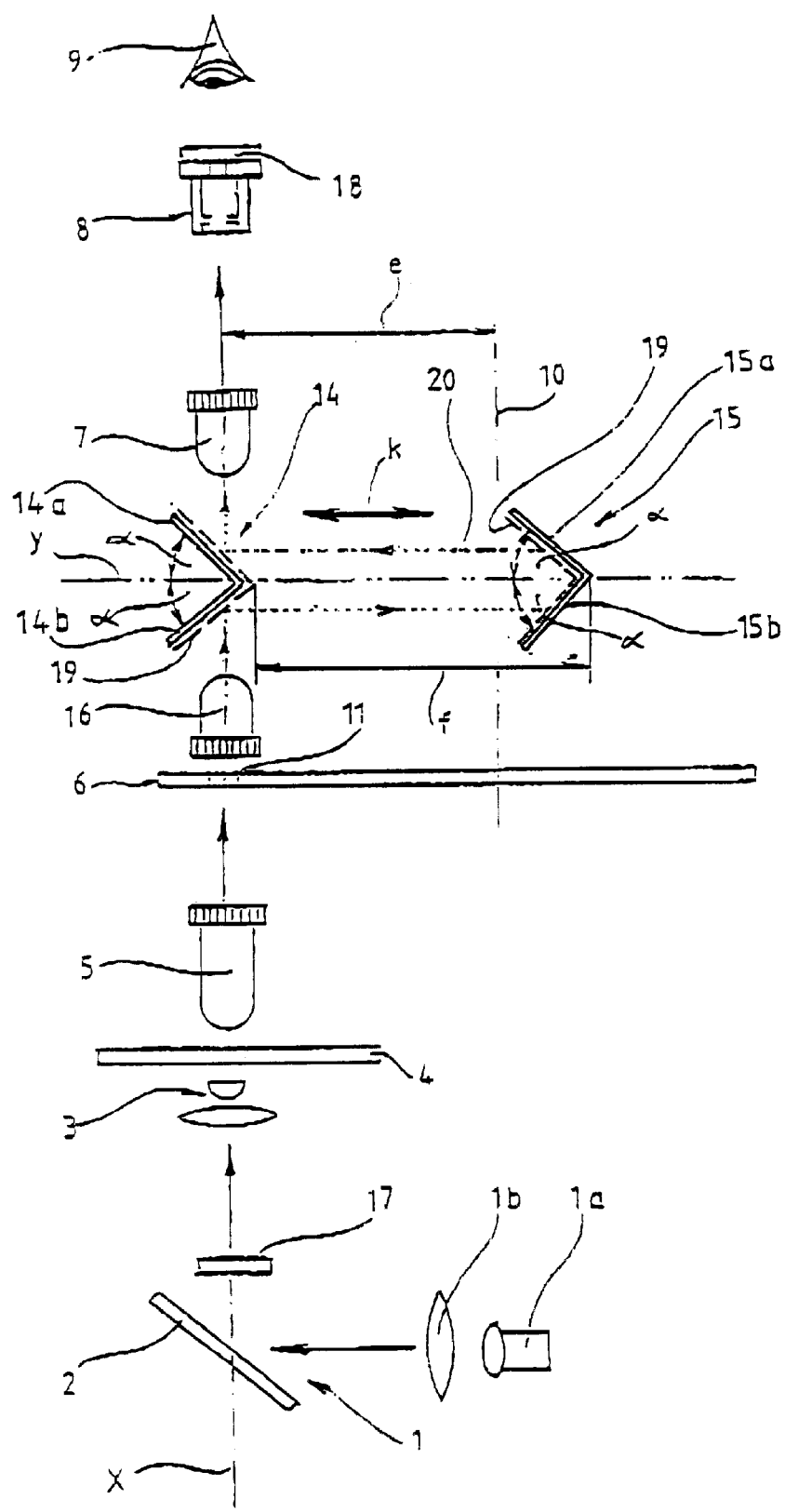
FIG. 2 is another example of the apparatus also shown in a schematic "exploded" diagram according to the invention, and also in a position built together with an optical microscope.

The illuminating unit 1 of the entire optical microscope system shown in FIG. 1 consists of a lamp 1a, a collector lens 1b, a mirror 2, which projects the light beam emitted by the lamp 1a onto the X optical axis of the system, which is obviously the optical axis of both the optical microscope and the apparatus according to the invention. In the present example of the apparatus the optical axis X is vertical. Going forward along the axis from the base towards the top, past the mirror 2 the following units are placed one after the other in line: a divided polar filter 17, the condenser lens 3, the object carrier 4, the primary objective 5, the rotatable circular disc-shaped image visualizing plate 6, the tertiary microscope objective 16, the secondary microscope objective 7, and the binocular 8 known in itself, which has two oculars (one of them situated behind the plane of the drawing, so it is invisible), and both oculars each have a polar filter 18 above their eyepieces. The primary microscope objective 5 and the secondary objective 7 are positioned identically, but, the tertiary objective 16 is placed in an inverse position to these. When using the system the object carrier 4 is to be inserted between the condenser lens 3 and primary objective 5. In FIG. 1 and FIG. 2 the user's eye is designated by reference number 9. It may also be observed in FIG. 1 that the vertical geometric rotation axis 10 of the image visualizing plate 6 extends from the optical axis X with eccentricity e, on which the path of the light beam is indicated by arrows.

According to the example in the system appearing on FIG. 1 the image visualizing plate 6, the tertiary objective 16, the secondary objective 7, as well as the binocular 8 are all parts of the apparatus according to the invention.

The apparatus also consists of the collector lens 1b, the divided polar filter 17 known in itself, inserted between the mirror 2 and the condenser lens 3, as well as the polar filter 18 mentioned before and positioned on the binocular 8. Due to the interaction of the polar filters arranged according to the above-described pattern and the rotating image visualizing plate 6 described later in detail, three-dimensional images appear in front of the eyes of the person using the apparatus, which was earlier only possible in this field when using very expensive stereo microscopes.

The use of the system according to FIG. 1 is as follows:

The object containing the image to be magnified, i.e. the object carrier 4 containing a microscopic section is placed between the condenser lens 3 and the primary objective 5, then the lamp 1a of the illuminating unit 1 is switched on. The image of the structure on the object carrier 4 will appear in the point of intersection of the optical axis X and of the image-producing device 6. The light beam generated by the illuminating unit 1 passes through the condenser lens 3 and is refracted on the structure of the object carrier 4, then the light beam is projected by the primary objective 5 onto the surface of the image visualizing layer of the image visualizing plate 6, shown in FIG. 3; in other words the structure is formed (imaged) here, on this layer. The image 11 (FIG. 1) is magnified further by the unit consisting of the tertiary objective 16, the secondary objective 7 and the binocular 8. The sharpness of the image is regulated by moving the tertiary objective 16 to-and-fro along the optical axis X; in the position shown in FIG. 1 the tertiary objective 16 is moved in the up and down direction. Due to the use of the tertiary objective 16, even in the case of magnifications exceeding two thousand times images with excellent quality, and images without any aberrations, fuzziness and colour faults are produced.

The optical system shown in. FIG. 2 is different from that shown in FIG. 1 only, however, in this case regulation of the depth sharpness does not take place by moving the tertiary objective 16 towards the secondary objective 7 and away from it, but the task is resolved by building two mirror-pairs 14 and 15 into the system, which are arranged at a variable distance f from each other. The mirrors 14a, 14b and 15a and 15b of mirror-pairs 14 and 15 are at a 90 degree angle with each other and the mirrors are at a 45 degree angle a to the plane A, which is vertical to the optical axis X and extends along the median line of the distance between the tertiary objective 16 and the secondary objective 7. The mirrors 14a, 14b and 15a, 15b diverge from me another starting from the plane y forming a V pattern as can be seen in FIG. 2. The mirror pair 14 is in a fixed position and its outside surface is coated with an amalgam layer 19, and the mirror pair 15 has such a layer on its inner surface. The position of the mirror pair 14 is fixed, and the mirror pair 15 can be moved to-and-fro as a single unit, as indicated in FIG. 2 by double arrows k. Due to the above detailed geometrical arrangement the mirrors 14a, 15a, and 14b, 15b are parallel to each other.

The function (use) of the system shown in FIG. 2 is practically identical with that shown in FIG. 1, except the setting of the image sharpness; namely in this case the setting of the sharpness of image 11 magnified further by the tertiary objective 16 is caused by moving the mirror-pairs 15 to-and-fro in the perpendicular direction to the optical axis X as indicated by the double arrows k. In FIG. 2 the path of an elementary ray of light between the tertiary objective 16 and the secondary objective 7 is shown by a dotted line and designated by reference number 20.

Figure 3:
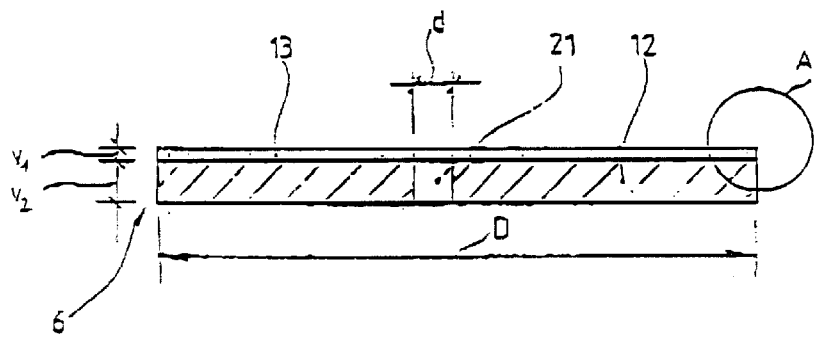
FIG. 3 is a preferred embodiment of the image-producing device according to the invention, shown in cross-section, in a blown up scale constituting a part of the apparatus.

In FIG. 3 a preferred example of the image visualizing plate 6 containing a carrying body of thickness $v_1$ and an image visualizing layer 13 of thickness $v_2$ can be seen in a much larger cross-sectional diagram, which is distorted in order to provide a better overall view. The requirements of the carrying body 12 are as follows: heat-resistance and resistance to deformation in the range of temperatures between minus 40° C. and plus 100° C.; its density (specific mass) has to be less than that of glass in order to be easily workable, even if it has a small thickness; it has to be sufficiently be rigid, yet sufficiently flexible. These requirements can be very well satisfied by a solid, circular disc made of transparent synthetic Plexiglas, or celluloid or acrylic, the diameter D of which can be 35–120 mm, the diameter d of the central aperture 6–40 mm, and the thickness v1 of the disc 0.75–8.0 mm. Instead of a solid synthetic material, also a screen plate may be used made of synthetic material or metal in which there are apertures the size of which is between 0.1–5.0 mm.

Figure 4:
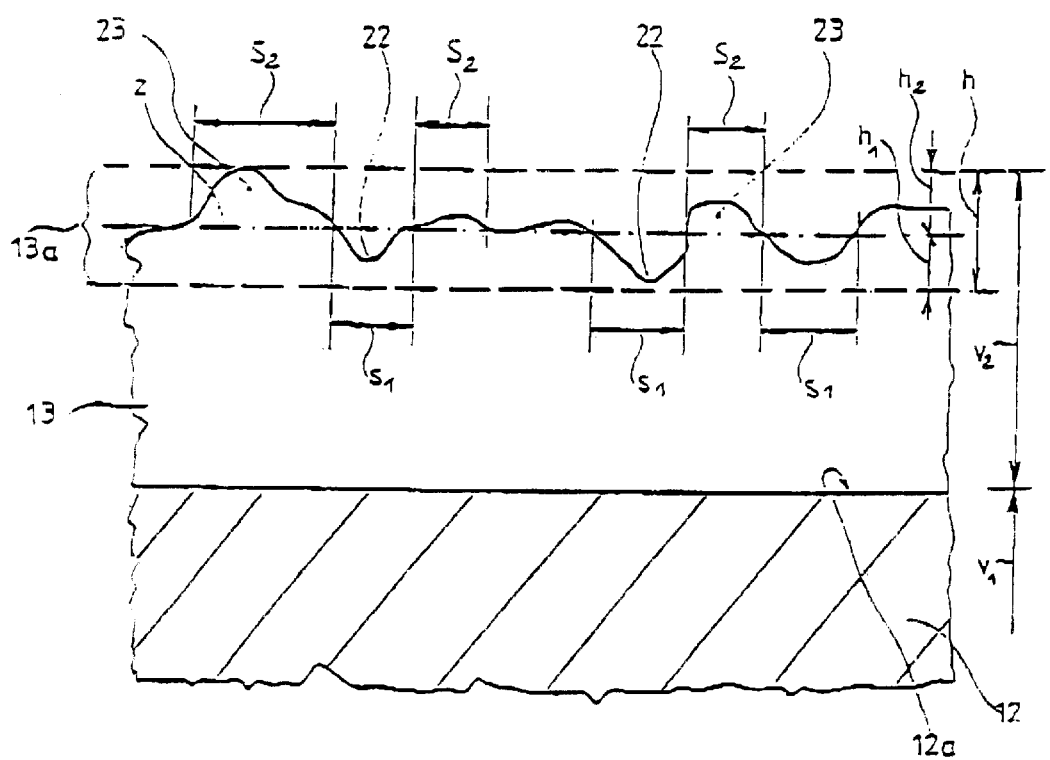
FIG. 4 is part A shown in FIG. 3 shown in larger scale.

The material of the image visualizing: layer 13 has to be applied in a liquid state to the surface of the carrying body 12. This material becomes solid after its application, yet it remains transparent in its solid state. The application of this material is executed in a way as a result of which in the zone of its free surface concavations (indentures) and protrusions blending into one another by curved sections are formed; in other words in general more or less irregular formations—configurations—are produced which are situated lower and higher. In FIG. 4 the surface structure of the image visualizing layer 13 is shown in a much larger scale than its natural size and the drawing is distorted in order to facilitate a better view. The total thickness v2 of the image visualizing layer 13 may be between 0.1–0.5 mm, and the height h of the surface zone containing the formations mentioned before may be between approximately 10.0 and 20.0 $\mu$m, e.g. it can be about 17.0 $\mu$m. The surface of the image visualizing layer 13 is designated by the reference letter B.

The concavations 22 are under a fictitious dividing plane Z extending parallel to the surface 12a of the carrying body 12 and the protrusions 23 are above this fictitious dividing plane Z and appear one after the other (alternately) as irregular configurations blending into each other with arcuate surfaces, and the average depth $h_1$ of said concavations 22 and height $h_2$ of said protrusions 23 may equally be 5–10 $\mu$m, but the degree of deviation of the size of certain concavations or/and protrusions from the average value may amount to about 10–50%. As for the average sideways dimensions—in projection seen from above, and reckoned from the section line with the fictitious dividing plane Z—the same values are valid, that is the average value of the widths $s_1$ and $s_2$ designated in FIG. 4 is preferably between 5–10 $\mu$m, and the deviation from the average may be about between 10–50%. Such a surface layer zone 13a may be created by using a two-component synthetic resin as the substance of the layer, a material of this kind is available under the commercial name "UVE Rapid"; synthetic foam "HUNGAROCELL", "NIKECELL" etc. dissolved in nitro-solvent; or polystyrene dissolved in a nitro-solvent; a synthetic varnish (nitro-varnish) etc. which substance (any of these substances) is applied to the surface 12a of the carrying body 12 /FIG. 4/ in its liquid state, then in its not yet solidified state its surface is levelled over e.g. with a granular rubber cylinder. In this way, the transparent substance adheres to the surface 12a of the carrying body 12, and then its own surface zone 13a becomes solid, though structured with the formations detailed above (FIG. 4). In this way the protrusions 23 and concavations 22 will be approximately identically deep and high and also their average sideways dimensions will be approximately equal. 20–50 concavations 22 and approximately the same number of protrusions 23 are to be created, per square centimetre ($cm^2$), as a consequence of which their projected range seen from above will be between 2–5 square centimetres ($cm^2$), and their width values $s_1$, $s_2$, measured on the fictitious dividing plane Z shown in FIG. 4 will be between 0.8–2.0 mm.

Advantageous qualities of the inventions can be summed up as follows:

combined with a traditional optical microscope, the apparatus according to the invention provides a unique possibility to examine three dimensional images at extra large magnification with increased relative depth sharpness, far beyond the capacity of a traditional optical microscope. This optical system provides further five times magnification in all ranges of the optical microscope. So a one thousand six hundred times magnification, which may be obtained by a hundred times objective and a sixteen times ocular can be increased to a magnification of eight thousand times.

The apparatus gives a spatial image of the observed object, yet keeps the advantageous characteristics of the traditional optical microscope, such as sharp and crisp contours, contrasts and perfect colours, beside the large magnification.

In the spatial image the relatively increased depth sharpness can be well observed. By the own magnification of the apparatus the total magnification of the optical system is increased in such a way so that the depth-sharpness does not change. To take an example: the total magnification of an optical microscope fitted with an objective and an ocular with a ten times magnification will be five hundred times, and its depth sharpness 25 microns. Whereas using an optical microscope of the same structure fitted with the apparatus according to the invention its total magnification will be five hundred times, but the original depth sharpness of 25 microns will remain. But if this five hundred times magnification were attained by using only an optical microscope the depth of sharpness of the image would decrease to about a few microns.

The system provides spatial images of microorganisms as well, so their behaviour can be studied in their natural environment.

The system give an experience to the user, as if a Comfocal Laser Scanning Microscope /CLSM/ combined with the optical microscope were being used. Information of such a range is obtained, which neither the CLSM, nor an optical microscope is capable of.

All this bears the promise of new vistas developing in upgrading the quality of microscopic observation:

in health care; in meticulous morphological examinations, in systems of haematogenesis, medulla and bacteriological research, also urine analyses and examinations, the spatial observation of native drops, in gene surgery, in artificial insemination; etc.; in medical research; in brain and cancer research, etc.; in biological research; in industry; in the production of semiconductors, in the scrutiny of materials; in criminal investigations, etc.

The structure of the image-producing device is exceptionally, simple, its production is economic and with its use, increased scale of magnifications, spatial images with relatively enhanced depth-sharpness, crisp contours, contrasts and excellent colour qualities are attained.

What is claimed is:

1. An Apparatus for use with an optical microscopes, said microscopes comprising an illuminating unit (1), a condenser lens (3), a primary microscope objective (5) with an optical axis (X), and an ocular or a camera; said apparatus being insertable between the primary microscope objective (5) and the ocular or camera, and said apparatus 2 comprising:

a rotatable image visualizing plate (6) and a secondary objective (7), whereby said secondary objective (7) is positioned on said optical axis (X) when the apparatus is inserted in the microscope and it has the same orientation as the primary microscope objective (5) wherein said apparatus includes a tertiary microscope objective (16) that is arranged between the image visualizing plate (6) and the secondary objective (7), the tertiary microscope objective (16) being arranged on the same optical axis (X) as the secondary objective (7) and being inversely orientated with respect to the secondary objective (7).

2. The Apparatus as claimed in claim 1, wherein the tertiary microscope objective (16) is movable to-and-fro along the optical axis (X) of the apparatus for regulating the sharpness of image.

3. The Apparatus as claimed in claim 1 or 2, wherein a divided linear polar foil (17) is arranged between a collector lens (1b) and the condenser lens (3) of the optical microscope and placing polar filter (18) on the ocular.

4. The Apparatus as claimed in claim 1, wherein said image visualizing plate (6) having a rigid, transparent carrying body (12) and a solid image visualizing layer (13) formed on the surface of the carrying body (12), said image visualizing layer (13) is formed by a transparent substance containing concavations (22) and protrusions (23) blending into each other with arcuate sections.

5. The Apparatus as claimed in claim 4, wherein the carrying body (12) is formed by a circular disc made of a solid plastic plate with a mass density lower than that of glass.

6. The Apparatus as claimed in claim 4, wherein the carrying body (12) is formed by a circular plastic or metal screen plate containing 0.5–3.0 mm apertures.

7. The Apparatus as claimed in claim 5 or 6, wherein the carrying body (12) is heat and deformation resistant in the temperature-range of −40° C. and +100° C. and has a thickness of 0.75–0.8 cm.

8. The Apparatus as claimed claim 7, including 20–50 concavations (22) and protrusions (23)/cm$^2$ in said image visualizing layer (23); the average depth ($h_1$) and height ($h_2$) of which under and above a fictitions dividing plane (z) is about 10.0–20.0 μm and the deviation from the average depth/height values is not more than 50%; and the area of projection of said concavations (22) and protrusions (23) appearing and measured under and above said fictitious dividing plane (Z) and blending into each other with arcuate sections is about between 2.0–5.0 mm$^2$.

* * * * *